(12) United States Patent
Sumiyama

(10) Patent No.: US 7,820,326 B2
(45) Date of Patent: Oct. 26, 2010

(54) ALKALINE BATTERY

(75) Inventor: Shinichi Sumiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 12/364,978

(22) Filed: Feb. 3, 2009

(65) Prior Publication Data

US 2010/0099028 A1   Apr. 22, 2010

(30) Foreign Application Priority Data

Oct. 17, 2008   (JP) .............................. 2008-269023

(51) Int. Cl.
*H01M 4/06*  (2006.01)
*H01M 4/50*  (2010.01)

(52) U.S. Cl. .................. 429/224; 429/229; 429/163

(58) Field of Classification Search ................ 429/224, 429/229, 163
See application file for complete search history.

(56) References Cited

U.S. PATENT DOCUMENTS

2004/0009400 A1   1/2004   Yamaguchi et al.
2005/0019658 A1   1/2005   Noya et al.
2005/0233215 A1   10/2005  Yamaguchi et al.
2008/0044730 A1   2/2008   Matsuhisa et al.

FOREIGN PATENT DOCUMENTS

| JP | 57-185674 | 11/1982 |
|---|---|---|
| JP | 07-183032 | 7/1995 |
| JP | 2000-113895 | 4/2000 |
| JP | 2003-234107 | 8/2003 |
| JP | 2004-047445 | 2/2004 |
| JP | 2004-186127 | 7/2004 |
| JP | 2007-188714 | 7/2007 |
| JP | 2008-47497 | 2/2008 |
| JP | 2008-234898 | 10/2008 |

*Primary Examiner*—Tracy Dove
(74) *Attorney, Agent, or Firm*—McDermott Will & Emery LLP

(57) ABSTRACT

The opening portion of a battery case is sealed with a sealing plate using a gasket. The potential of electrolytic manganese dioxide in a positive electrode active material is in the range from 275 to 320 mV. The volume of a closed space formed between the gasket and positive and negative electrodes in the battery case is in the range from 2.0 to 6.0% of the volume inside the battery formed by the battery case and the sealing plate.

6 Claims, 2 Drawing Sheets

ALKALINE BATTERY

CROSS-REFERENCE TO RELATED APPLICATION

This application claims priority from Japanese application JP2008-269023 filed on Oct. 17, 2008, the disclosure of which application is hereby incorporated by reference into this application in its entirety for all purposes.

BACKGROUND

The present disclosure generally relates to alkaline batteries using electrolytic manganese dioxide as positive electrode active materials.

With recent rapid widespread use of mobile electronic equipment, alkaline batteries have been widely used as power supplies for such equipment because of their high energy density per unit weight. As typical materials for positive electrode active materials of the alkaline batteries, electrolytic manganese dioxide (EMD) is known. Electrolytic manganese dioxide generally contains moisture, ash, and other inevitable substances, and the net purity (i.e., the purity of a portion functioning as an active material) of manganese dioxide ($MnO_2$) in electrolytic manganese dioxide is 90-something percents. The technique of increasing the potential of manganese dioxide (typically 270 mV or more) in order to enhance discharge performance is known (see Japanese Laid-Open Patent Publication No. 2004-47445).

SUMMARY

This Summary is provided to introduce a selection of concepts in a simplified form that are further described below in the Detailed Description. It is not intended to identify key features of the claimed subject matter, nor is it intended to be used as an aid in determining the scope of the claimed subject matter.

The invention disclosed and claimed herein, in one aspect thereof, an alkaline battery using electrolytic manganese dioxide at high potential (275 mV to 320 mV) as a positive electrode active material employs a structure in which the volume of a closed space formed between a gasket and positive and negative electrodes stored in a battery case is in the range from 2.0% to 6.0% of the volume within the battery formed by the battery case and a sealing plate.

Specifically, an alkaline battery according to an example embodiment of the present invention is an alkaline battery in which a positive electrode and a negative electrode are housed in a battery case with a separator interposed therebetween. The battery case has an opening portion sealed with a sealing plate using a gasket. The positive electrode contains electrolytic manganese dioxide at a potential in the range from 275 mV to 320 mV with respect to a referencel electrode of mercurous oxide (Hg/HgO). The negative electrode contains zinc. A closed space is formed between the gasket and the positive and negative electrodes in the battery case and has a volume in the range from 2.0% to 6.0% of a volume inside the battery formed by the battery case and the sealing plate.

In the alkaline battery using high-potential electrolytic manganese dioxide as a positive electrode active material, the volume of the closed space formed between the gasket and the positive and negative electrodes in the battery case is reduced so that reduction reaction of manganese dioxide caused by hydrogen gas is suppressed, thus enhancing initial discharge performance and achieving high performance while suppressing deterioration of discharge performance after storage.

DETAILED DESCRIPTION

Figure 1:
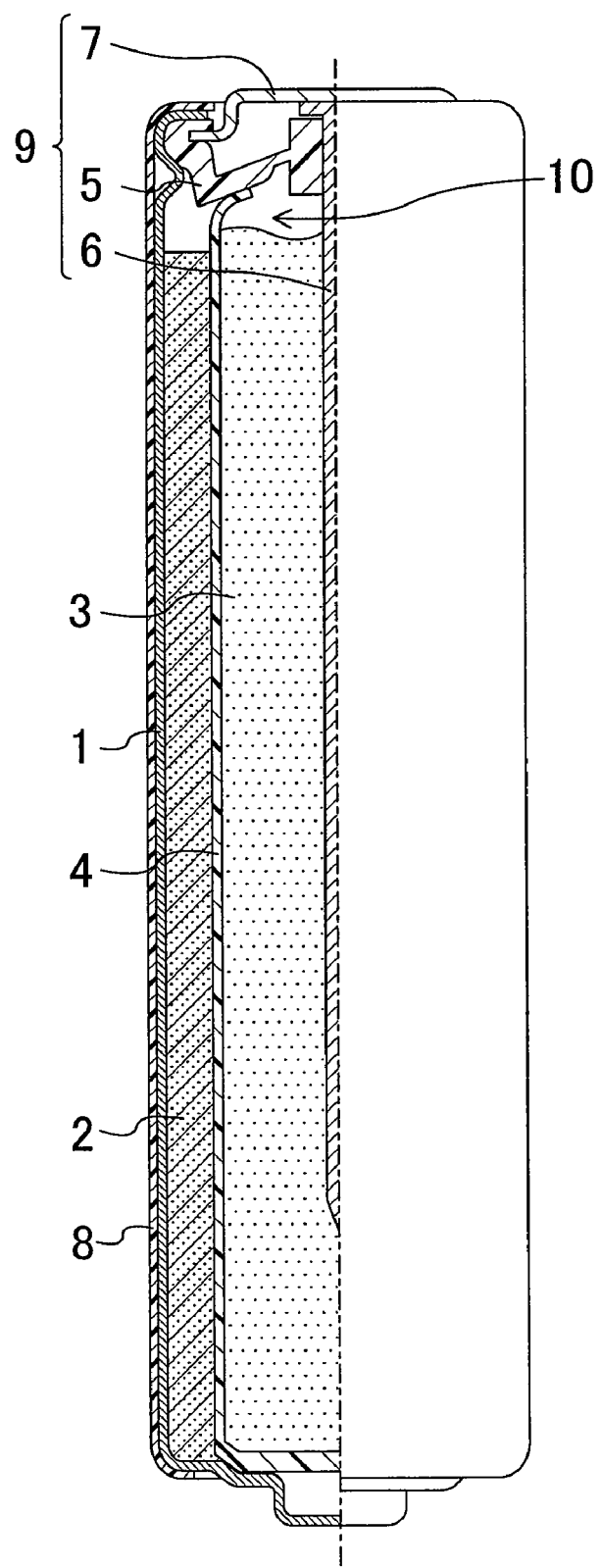
FIG. 1 is a half sectional view illustrating a structure of an alkaline battery according to a preferred embodiment of the present invention.

It is generally known that when high-potential electrolytic manganese dioxide is used as a positive electrode active material, initial discharge performance is enhanced whereas discharge performance after storage deteriorates.

Table 1 shows results of measurements on initial discharge performance, discharge performance after storage, and a shelf life (i.e., the remaining percentage) carried out by an inventor of this disclosure by fabricating an AA alkaline battery using high-potential electrolytic manganese dioxide.

TABLE 1

| | EMD potential mV | discharge performance | | remaining percentage % |
|---|---|---|---|---|
| | | initial number of cycles | after storage number of cycles | |
| battery 1 | 265 | 140 | 126 | 90.0 |
| battery 2 | 275 | 142 | 122 | 85.9 |
| battery 3 | 290 | 145 | 120 | 82.8 |
| battery 4 | 305 | 146 | 117 | 80.1 |
| battery 5 | 320 | 149 | 118 | 79.2 |

In Table 1, the initial discharge performance was obtained by performing, within a month after fabrication of the battery, heavy-load pulse discharge (in which a process of discharging the battery at 1.5 W for 2 seconds and then discharging the battery at 0.65 W for 28 seconds was repeated 10 cycles per one hour) to evaluate discharge duration (in terms of cycles) until the closed circuit voltage reached 1.05 V. The discharge performance after storage was obtained by evaluating, after storage at 60° C. for one week (corresponding one year at ordinary temperature), discharge duration (cycles) until the closed circuit voltage reached 1.05 V under the same heavy-load pulse discharge conditions as those for the initial discharge performance. The shelf life was evaluated based on the proportion of discharge performance after storage (i.e., the remaining percentage) for the initial discharge performance.

As shown in Table 1, as the potential of electrolytic manganese dioxide increases, the initial discharge performance is enhanced, whereas the shelf life (remaining percentage) greatly deteriorates, so that an inversion phenomenon in which the discharge performances after storage of the batteries 2 to 5 at EMD potentials from 275 mV to 320 mV become lower than that of the battery 1 at an EMD potential of 265 mV.

Such degradation of the shelf life is considered to be because crystal distortion of manganese dioxide occurring when an alkaline battery using electrolytic manganese dioxide at a high potential of 270 mV or more is stored for a long time (see Japanese Laid-Open Patent Publication No. 2007-188714).

In view of this, this publication discloses a technique for enhancing the initial discharge performance as well as suppressing deterioration of the discharge performance after storage by using, as a positive electrode active material, electrolytic manganese dioxide at a potential less than 270 mV with a stable crystal structure and by employing a positive electrode material mixture in which graphite in a given ratio (5 wt % to 7 wt %) with respect to that electrolytic manganese dioxide is added to the electrolytic manganese dioxide.

However, by adding graphite at a given ratio, though the initial discharge performance is enhanced, it is difficult to ensure superiority of the initial discharge performance as long as electrolytic manganese dioxide at a potential less than 270 mV or less is used as a positive electrode active material.

The inventor of this disclosure studied what caused a large decrease in remaining percentage after storage except for crystal distortion of manganese dioxide when high-potential electrolytic manganese dioxide was used, and finally obtained the following findings.

An analysis of gas within a battery after storage shows that most of this gas is hydrogen gas. This hydrogen gas is considered to be generated by corrosion of zinc powder in a gelled negative electrode and be accumulated in a closed space formed between a gasket and positive and negative electrodes in a battery case during storage.

Degradation of the shelf life in low-potential electrolytic manganese dioxide is generally considered to be because oxidation-reduction reaction between manganese dioxide and graphite in a positive electrode material mixture causes reduction reaction of manganese dioxide to lower the degree of oxidation (see Japanese Laid-Open Patent Publication No. 7-183032).

However, it is expected that since high-potential electrolytic manganese dioxide has a high degree of activity, reduction reaction of manganese dioxide caused by hydrogen gas accumulated in a closed space formed between a gasket and positive and negative electrodes during storage becomes conspicuous as compared to the reduction reaction of manganese dioxide caused by graphite to cause great degradation of the shelf life (the remaining percentage).

From the foregoing findings, the inventor has reached an idea that great degradation of the shelf life can be suppressed even in the case of using high-potential electrolytic manganese dioxide by suppressing reduction reaction of manganese dioxide caused by hydrogen gas. To achieve this, it is effective, for suppressing reduction reaction of manganese dioxide caused by hydrogen gas, to reduce the volume of the closed space formed between the gasket and the positive and negative electrodes in the battery case to reduce the space in which hydrogen gas is accumulated.

Hereinafter, a preferred embodiment of the present invention will be described with reference to the drawings. The present invention is not limited to the following embodiment.

FIG. 1 is a half sectional view illustrating a structure of an alkaline battery according to a preferred embodiment of the present invention. As illustrated in FIG. 1, a positive electrode 2 containing electrolytic manganese dioxide and a gelled negative electrode 3 containing zinc are housed in a cylindrical battery case 1 with a bottom with a separator 4 interposed therebetween, and an opening portion of the battery case 1 is sealed by a sealing unit 9 including a gasket 5, a negative electrode current collector 6, and a negative electrode terminal plate (sealing plate) 7.

Table 2 shows results of measurement of initial discharge performance, discharge performance after storage, and the ratio (i.e., the remaining percentage) of discharge performance after storage with respect to initial discharge performance for AA alkaline batteries 6 through 20 each obtained by changing the heights of the positive electrode 2 and the negative electrode 3 such that the capacity of a closed space 10 formed by the gasket 5 and the positive and negative electrodes 2 and 3 in the battery case 1 varied in the range from 10.8% to 2.0% of the volume inside the battery formed by the battery case 1 and the sealing plate 7 in each of alkaline batteries in which the potentials of electrolytic manganese dioxide (EMD) were set at 275 mV, 305 mV, and 320 mV, respectively.

TABLE 2

| | EMD potential mV | positive electrode height mm | negative electrode height mm | volume of closed space % | discharge performance | | remaining percentage % |
| --- | --- | --- | --- | --- | --- | --- | --- |
| | | | | | initial number of cycles | after storage number of cycles | |
| battery 6 | 275 | 40.0 | 40.0 | 10.8 | 142 | 122 | 85.9 |
| battery 7 | | 40.5 | 40.5 | 8.4 | 145 | 127 | 87.6 |
| battery 8 | | 41.0 | 41.0 | 6.0 | 147 | 130 | 88.4 |
| battery 9 | | 41.4 | 41.3 | 4.4 | 152 | 139 | 91.4 |
| battery 10 | | 41.7 | 41.9 | 2.0 | 153 | 139 | 90.8 |
| battery 11 | 305 | 40.0 | 40.0 | 10.8 | 146 | 118 | 80.1 |
| battery 12 | | 40.5 | 40.5 | 8.4 | 148 | 125 | 84.4 |
| battery 13 | | 41.0 | 41.0 | 6.0 | 150 | 136 | 90.7 |
| battery 14 | | 41.4 | 41.3 | 4.4 | 154 | 139 | 90.3 |
| battery 15 | | 41.7 | 41.9 | 2.0 | 158 | 144 | 91.1 |
| battery 16 | 320 | 40.0 | 40.0 | 10.8 | 149 | 118 | 79.2 |
| battery 17 | | 40.5 | 40.5 | 8.4 | 150 | 124 | 82.7 |
| battery 18 | | 41.0 | 41.0 | 6.0 | 158 | 139 | 88.0 |
| battery 19 | | 41.4 | 41.3 | 4.4 | 161 | 143 | 88.8 |
| battery 20 | | 41.7 | 41.9 | 2.0 | 168 | 150 | 89.3 |

In Table 2, the initial discharge performance and the discharge performance after storage were obtained in the same manner as in the method used for Table 1.

The potential of electrolytic manganese dioxide was adjusted by varying the mole fractions of manganese and sulfuric acid in an electrolysis process using a manganese sulfate solution as an electrolyte. The resultant electrolytic manganese dioxide was immersed in a 40% KOH aqueous solution, and then the potential difference between this electrolytic manganese dioxide and a reference electrode of mercurous oxide (Hg/HgO) was measured with the solution temperature kept at 21±1° C., thereby obtaining the potential of the electrolytic manganese dioxide.

The filling heights of the positive electrode 2 and the negative electrode 3 may be obtained by, for example, imaging a battery with an X-ray fluoroscopic camera and measuring the distance from the bottom face to the top face of the positive or negative electrode 2 or 3. In a case where the top face of the negative electrode 3 was not in parallel with the bottom face thereof, a middle point between the uppermost level and the lowermost level was taken as the top face for measurement.

As shown in Table 2, in the alkaline batteries 6 through 20 using electrolytic manganese dioxide at high potentials (275 mV to 320 mV), the remaining percentage after storage increases as the volume of the closed space 10 decreases. That is, reduction reaction of manganese dioxide caused by hydrogen gas can be suppressed by reducing the space in which hydrogen gas generated during storage is accumulated, thus making it possible to suppress degradation of shelf life.

In particular, by reducing the volume of the closed space 10 to the range from 2.0% to 6.0% of the volume inside the battery formed by the battery case 1 and the sealing plate 7, the remaining percentage after storage can be restored to a level close to that of the battery 1 of low-potential EMD shown in Table 1.

To reduce the volume of the closed space 10, the filling heights of the positive electrode 2 and the negative electrode 3 stored in the battery case 1 are increased. This also leads to improved initial discharge performance in accordance with an increase in amount of the active materials.

In terms of reliability, the closed space 10 formed between the gasket 5 and the positive and negative electrodes 2 and 3 preferably has a volume necessary for suppressing a pressure rise of hydrogen gas (which is generated when an impurity such as iron or nickel is mixed in the negative electrode 3 to form a local battery with zinc, for example) generated with a problem in battery fabrication. In this respect, since high-potential electrolytic manganese dioxide is used in this disclosure, hydrogen gas (which is different from hydrogen gas accumulated in the closed space 10 during storage) generated with a problem can be efficiently absorbed. Thus, even when the closed space 10 has a small volume, it is possible to suppress a pressure rise at the occurrence of a fabrication problem.

It should be noted that the "closed space 10" herein is a space formed between the gasket 5 and the positive and negative electrodes 2 and 3 in the battery case 1 and excludes the volumes occupied by a portion of the separator 4 extending upward from the surfaces of the positive and negative electrodes 2 and 3 and in contact with the bottom of the gasket 5 and by the negative electrode current collector 6 projecting upward from the negative electrode 3 and inserted in the gasket 5. The space formed between the gasket 5 and the sealing plate 7 is not included either.

The volume of the closed space 10 can be measured by, for example, an underwater replacement process. Specifically, a battery to be measured is disassembled under water so that air in the closed space 10 is taken, thereby measuring the volume of the closed space 10. The battery to be measured is preferably a battery fabricated within six months, and preferably within three months, before the measurement.

This disclosure offers an increased remaining percentage after storage by reducing the volume of the closed space 10 to suppress reduction reaction of manganese dioxide caused by hydrogen gas accumulated in the closed space 10 during storage. This increase in remaining percentage after storage due to suppression of reduction reaction of manganese dioxide caused by hydrogen is further promoted by providing the following measures.

Figure 2:
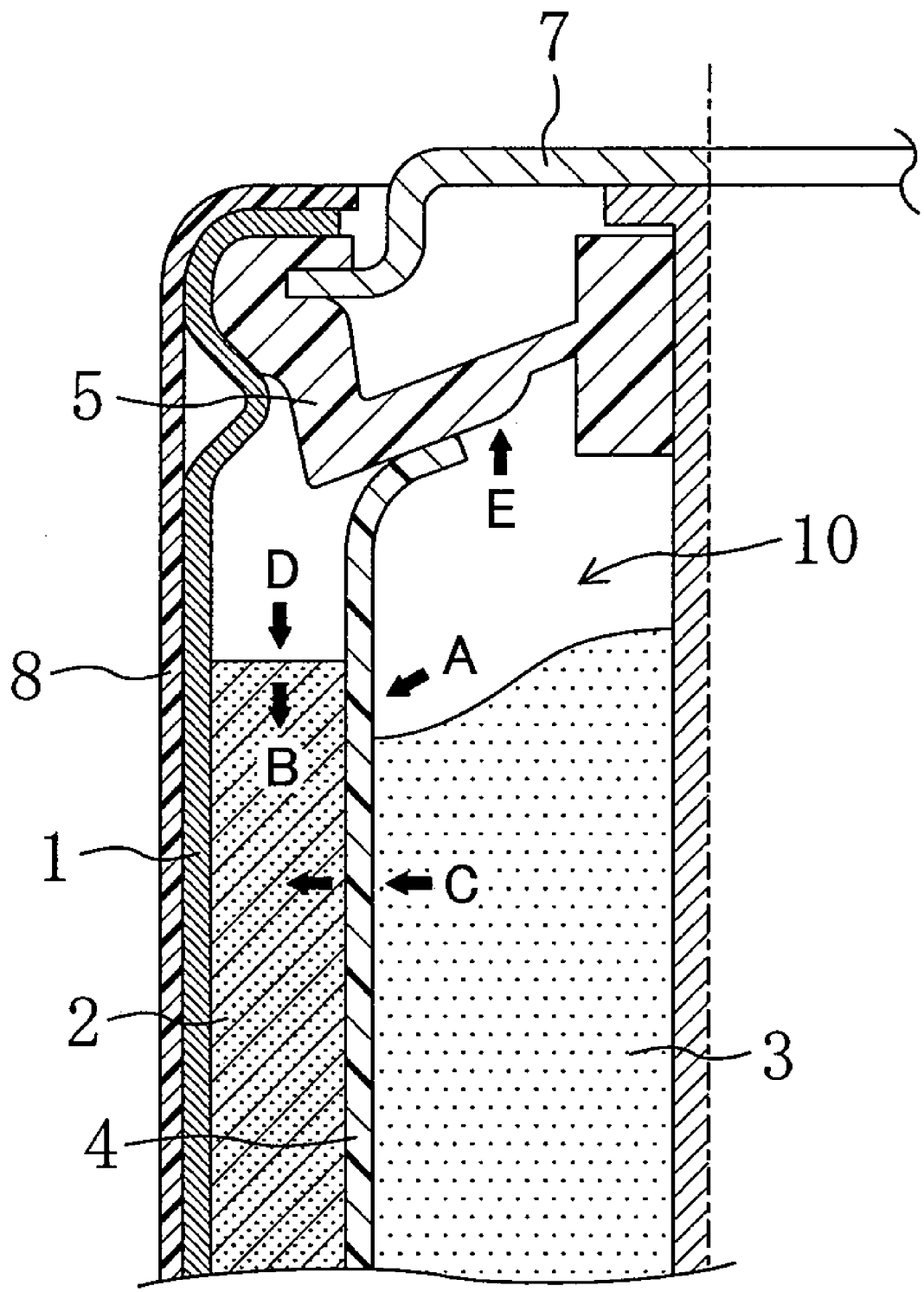
FIG. 2 is a partial cross-sectional view of an alkaline battery with paths of reaction between hydrogen gas and manganese dioxide.

FIG. 2 is a partial cross-sectional view of an alkaline battery. Arrows A through D in FIG. 2 indicate the respective paths along which hydrogen gas accumulated in the closed space 10 during storage reacts with electrolytic manganese dioxide contained in the positive electrode 2.

The path indicated by arrow A corresponds to a case where the height of the negative electrode 3 becomes smaller han that of the positive electrode 2 so that the side face of the positive electrode 2 partially projects from the surface of the negative electrode 3 and hydrogen gas penetrates the separator 4 at this projecting portion to enter the positive electrode 2 and react with manganese dioxide. To increase the reaction efficiency between the positive electrode 2 and the negative electrode 3, the heights of the positive electrode 2 and the negative electrode 3 stored in the battery case 1 are generally set equal to each other such that the opposing area therebetween is at the maximum. However, because of variations in manufacture and other factors, the heights of the positive and negative electrodes 2 and 3 differ from each other or, as illustrated in FIG. 2, the gelled negative electrode 3 has an uneven surface in some cases. In such cases, the side face of the positive electrode 2 might partially project from the surface of the negative electrode 3.

Table 3 shows results of measurement of initial discharge performance, discharge performance after storage, and the ratio (i.e., the remaining percentage) of discharge performance after storage with respect to initial discharge performance for AA alkaline batteries 13 through 15 and 21 through 29 each obtained by changing the height ratio of the negative electrode 3/the positive electrode 2 in the range from 0.96 to 1.08 in alkaline batteries in which the potential of electrolytic manganese dioxide (EMD) was fixed at 305 mV and the proportions of the volumes of the closed spaces 10 with respect to the volumes within the batteries were set at 6.0%, 4.4%, and 2.0%, respectively.

TABLE 3

| | EMD potential mV | positive electrode height mm | negative electrode height mm | volume of closed space % | height ratio of negative electrode/ positive electrode | discharge performance | | |
|---|---|---|---|---|---|---|---|---|
| | | | | | | initial number of cycles | after storage number of cycles | remaining percentage % |
| battery 21 | 305 | 42.0 | 40.5 | 6.0 | 0.96 | 149 | 132 | 88.6 |
| battery 13 | | 41.0 | 41.0 | | 1.00 | 150 | 136 | 90.7 |
| battery 22 | | 40.0 | 41.5 | | 1.04 | 151 | 138 | 91.4 |
| battery 23 | | 39.0 | 42.0 | | 1.08 | 152 | 140 | 92.1 |
| battery 24 | | 42.0 | 41.0 | 4.4 | 0.98 | 154 | 136 | 88.3 |
| battery 14 | | 41.4 | 41.3 | | 1.00 | 154 | 139 | 90.3 |

TABLE 3-continued

|  | EMD potential mV | positive electrode height mm | negative electrode height mm | volume of closed space % | height ratio of negative electrode/ positive electrode — | discharge performance | | |
|---|---|---|---|---|---|---|---|---|
|  |  |  |  |  |  | initial number of cycles | after storage number of cycles | remaining percentage % |
| battery 25 |  | 40.2 | 41.9 |  | 1.04 | 156 | 143 | 91.7 |
| battery 26 |  | 39.2 | 42.4 |  | 1.08 | 156 | 144 | 92.3 |
| battery 27 |  | 42.5 | 41.5 | 2.0 | 0.98 | 155 | 137 | 88.4 |
| battery 15 |  | 41.7 | 41.9 |  | 1.00 | 158 | 144 | 91.1 |
| battery 28 |  | 40.7 | 42.4 |  | 1.04 | 159 | 146 | 91.8 |
| battery 29 |  | 39.7 | 42.9 |  | 1.08 | 160 | 148 | 92.5 |

As shown in Table 3, for each volume of the closed space 10, as the height ratio of the negative electrode 3/the positive electrode 2 increases from 1.00, the remaining percentage increases, whereas the height ratio decreases from 1.00, the remaining percentage decreases. That is, when the height of the negative electrode 3 stored in the battery case 1 is set larger than that of the positive electrode 2, oxidation-reduction reaction between hydrogen gas and manganese dioxide in the path indicated by arrow A in FIG. 2 is suppressed, thus further increasing the remaining percentage after storage.

Next, the path indicated by arrow B corresponds to a case where hydrogen gas accumulated in the closed space 10 enters the positive electrode 2 to react with manganese dioxide. In general, the positive electrode 2 is formed by mixing electrolytic manganese dioxide powder as a positive electrode active material with graphite powder as a conductive agent and an alkaline electrolyte, for example, and then molding the mixture under pressure. When the density of the pressed compact (i.e., $MnO_2$ density) increases, diffusion of hydrogen gas into the positive electrode 2 and contact between manganese dioxide and hydrogen gas are suppressed, so that oxidation-reduction reaction between hydrogen gas and manganese dioxide can be suppressed.

Table 4 shows results of measurement of initial discharge performance, discharge performance after storage, and the ratio (i.e., the remaining percentage) of discharge performance after storage with respect to initial discharge performance for AA alkaline batteries 30 and 31 obtained by changing the $MnO_2$ density in the range from 2.55 to 2.70 $g/cm^3$ in the alkaline battery 25 ($MnO_2$ density: 2.40 $g/cm^3$) shown in Table 3.

dioxide constituting the positive electrode 2 with respect to the volume of the positive electrode 2. The "$MnO_2$ density" may be measured by, for example, the following method:

First, the battery is subjected to X-ray fluoroscopy so that the outside diameter, inside diameter, and the height of the positive electrode 2 are measured, thereby calculating the volume of the positive electrode 2. Then, the battery is disassembled so that the whole positive electrode 2 is taken out to be fully dissolved in acid and an insoluble matter is filtered off, thereby obtaining an aqueous solution. Thereafter, with ICP (inductively coupled plasma) spectrometry, the content of manganese (Mn) in this solution is measured and is converted into the manganese dioxide ($MnO_2$) amount, thereby obtaining the weight of manganese dioxide contained in the positive electrode 2. In this manner, the "$MnO_2$ density" is obtained.

Then, the path indicated by arrow C corresponds to a case where hydrogen gas accumulated in the closed space 10 enters the positive electrode 2 from a portion opposing the negative electrode 3 through the separator 4 to react with manganese dioxide. In general, the separator 4 is formed of a porous membrane capable of retaining an alkaline electrolyte. When the air permeability of the separator 4 is reduced within the range in which the retention of the alkaline electrolyte is kept, entering of hydrogen gas into the positive electrode 2 is suppressed, so that suppression of oxidation-reduction reaction between hydrogen gas and manganese dioxide is expected.

Table 5 shows results of measurements of initial discharge performance, discharge performance after storage, and the

TABLE 4

|  | EMD potential mV | $MnO_2$ density $g/cm^3$ | volume of closed space % | height ratio of negative electrode/ positive electrode — | discharge performance | | |
|---|---|---|---|---|---|---|---|
|  |  |  |  |  | initial number of cycles | after storage number of cycles | remaining percentage % |
| battery 25 | 305 | 2.40 | 4.4 | 1.04 | 156 | 143 | 91.7 |
| battery 30 |  | 2.55 |  |  | 159 | 151 | 95.0 |
| battery 31 |  | 2.70 |  |  | 160 | 152 | 95.1 |

As shown in Table 4, the $MnO_2$ density is increased to the range from 2.55 to 2.70 $g/cm^3$, so that the remaining percentage after storage is further increased. When the $MnO_2$ density exceeds 2.70 $g/cm^3$, it becomes difficult to form the positive electrode 2 by molding under pressure.

The "$MnO_2$ density" herein is the ratio of weight of manganese dioxide ($MnO_2$) contained in electrolytic manganese ratio (i.e., the remaining percentage) of discharge performance after storage with respect to initial discharge performance for AA alkaline batteries 32 through 34 obtained by changing the air permeability of the separator 4 in the range from 10.0 to 4.0 $cc/cm^2/sec$ in the alkaline battery 25 (air permeability of the separator 4: 14.8 $cc/cm^2/sec$) shown in Table 3.

TABLE 5

| | EMD potential mV | air permeability of separator cc/cm²/sec | volume of closed space % | height ratio of negative electrode/ positive electrode | discharge performance | | |
|---|---|---|---|---|---|---|---|
| | | | | | initial number of cycles | after storage number of cycles | remaining percentage % |
| battery 25 | 305 | 14.8 | 4.4 | 1.04 | 156 | 143 | 91.7 |
| battery 32 | | 10.0 | | | 158 | 149 | 94.3 |
| battery 33 | | 7.0 | | | 157 | 151 | 96.2 |
| battery 34 | | 4.0 | | | 155 | 149 | 96.1 |

As shown in Table 5, the air permeability of the separator 4 is set in the range from 4.0 to 10.0 cc/cm²/sec so that the remaining percentage after storage can be further increased. Air permeabilities of the separator 4 less than 4.0 cc/cm²/sec are unpreferable because the retention amount of the alkaline electrolyte decreases so that discharge capacity decreases.

The "air permeability" herein is the volume of air permitted to flow per an area of the separator 4 in a unit period of time. The "air permeability" can be measured with a Frajour type testing machine conforming to JIS L 1096 6.27 "Testing methods for woven fabrics air permeability", for example.

The path indicated by arrow D corresponds to a case where hydrogen gas accumulated in the closed space 10 enters the positive electrode 2 from the surface of the positive electrode 2 toward the gasket 5 to react with manganese dioxide. As described above, the positive electrode 2 is formed of a pressed compact (e.g., a positive electrode pellet molded under pressure in a hollow cylinder) obtained by molding electrolytic manganese dioxide powder, graphite powder, and an alkaline electrolyte, for example, under pressure. When a protective film for reducing or preventing penetration of hydrogen gas is formed on the surface of the positive electrode 2, entering of hydrogen gas into the positive electrode 2 can be suppressed, so that suppression of oxidation-reduction reaction between hydrogen gas and manganese dioxide is expected.

Table 6 shows results of measurement of initial discharge performance, discharge performance after storage, and the ratio (i.e., the remaining percentage) of discharge performance after storage with respect to initial discharge performance for AA alkaline batteries 35 and 36 each obtained by forming a protective film of asphalt or polyvinyl alcohol (PVA) on the surface of the positive electrode 2 of the alkaline battery 25 (in which no protective film is formed on the surface of the positive electrode 2) shown in Table 3.

As shown in Table 6, by forming a protective film for reducing or preventing penetration of hydrogen gas on the surface of the positive electrode 2, the remaining percentage after storage can be further increased.

The protective film on the surface of the positive electrode 2 may be formed in the following manner: For example, in the case of a protective film made of asphalt, this protective film is formed by melting asphalt by heat and applying the molten asphalt onto the surface of the positive electrode 2. In the case of a protective film of polyvinyl alcohol, this protective film is formed by dissolving polyvinyl alcohol in water and applying the resultant aqueous solution onto the surface of the positive electrode 2. Application of a solution in which polyvinyl alcohol is dissolved in an organic solvent is unpreferable because manganese dioxide is reduced so that the remaining percentage after storage decreases. Resins or rubbers may also be applied to the surface of the positive electrode 2 in the form of water-based emulsion.

Though this is not means for directly reducing the reaction between manganese dioxide and hydrogen gas accumulated in the closed space 10 as described above, hydrogen gas accumulated in the closed space 10 may be released to the outside (i.e., a space formed between the gasket 5 and the sealing plate 7) through the gasket 5 along the path indicated by arrow E in FIG. 2 so that the amount of hydrogen gas is substantially reduced, thus suppressing oxidation-reduction reaction between hydrogen gas and manganese dioxide. In general, the tip of the separator 4 is brought into contact with the gasket 5 in a given length as illustrated in FIG. 2 in order to prevent leakage of the gelled negative electrode 3 into the positive electrode 2 from a portion between the separator 4 and the gasket 5 upon application of vibration or impact to the battery. When the length of the separator 4 in contact with the

TABLE 6

| | EMD potential mV | protective film | volume of closed space % | height ratio of negative electrode/ positive electrode | discharge performance | | |
|---|---|---|---|---|---|---|---|
| | | | | | initial number of cycles | after storage number of cycles | remaining percentage % |
| battery 25 | 305 | none | 4.4 | 1.04 | 156 | 143 | 91.7 |
| battery 35 | | asphalt | | | 157 | 150 | 95.5 |
| battery 36 | | PVA | | | 157 | 149 | 94.9 | gasket 5 is reduced in the range in which the gelled negative electrode 3 does not leak into the positive electrode 2, hydrogen gas accumulated in the closed space 10 is more easily released to the outside, so that oxidation-reduction reaction between hydrogen gas and manganese dioxide can be suppressed.

Table 7 shows results of measurement of initial discharge performance, discharge performance after storage, and the ratio (i.e., the remaining percentage) of discharge performance after storage with respect to initial discharge performance for AA alkaline batteries 37 and 38 each obtained by reducing the length of a portion of the separator 4 in contact with the gasket 5 (hereinafter, referred to the gasket-contact length) to the range from 2.5 mm to 1.0 mm in the alkaline battery 25 (in which the gasket-contact length of the separator 4 is 3.5 mm) shown in Table 3.

TABLE 7

| | EMD potential mV | gasket-contact length mm | volume of closed space % | height ratio of negative electrode/positive electrode | discharge performance | | |
|---|---|---|---|---|---|---|---|
| | | | | | initial number of cycles | after storage number of cycles | remaining percentage % |
| battery 25 | 305 | 3.5 | 4.4 | 1.04 | 156 | 143 | 91.7 |
| battery 37 | | 2.5 | | | 158 | 149 | 94.3 |
| battery 38 | | 1.0 | | | 158 | 150 | 94.9 |

As shown in Table 7, the gasket-contact length of the separator 4 is set in the range from 1.0 mm to 2.5 mm, thus further increasing the remaining percentage after storage. Gasket-contact lengths of the separator 4 less than 1.0 mm are unpreferable because leakage of the gelled negative electrode 3 toward the positive electrode 2 upon application of vibration or impact to the battery in this range is not sufficiently prevented.

In the foregoing description, in addition to reduction of volume of the closed space 10, various means for suppressing reduction reaction of manganese dioxide caused by hydrogen gas accumulated in the closed space 10 during storage and advantages thereof are mentioned. Such means may, of course, be appropriately combined to more effectively increase the remaining percentage after storage.

Table 8 shows results of measurement of initial discharge performance, discharge performance after storage, and the ratio (i.e., the remaining percentage) of discharge performance after storage with respect to initial discharge performance for AA alkaline batteries 39 through 42 each obtained by appropriately adjusting the $MnO_2$ density, the separator air permeability, and the gasket-contact length in combination within the range in which their respective effects are exerted.

TABLE 8

| | EMD potential mV | $MnO_2$ density g/cm³ | air permeability of separator cc/cm²/sec | gasket-contact length mm | volume of closed space % | height ratio of negative electrode/positive electrode | discharge performance | | |
|---|---|---|---|---|---|---|---|---|---|
| | | | | | | | initial number of cycles | after storage number of cycles | remaining percentage % |
| battery 25 | 305 | 2.40 | 14.8 | 3.5 | 4.4 | 1.04 | 156 | 143 | 91.7 |
| battery 39 | | 2.55 | 7.0 | 3.5 | | | 161 | 158 | 98.1 |
| battery 40 | | 2.40 | 7.0 | 2.5 | | | 159 | 155 | 97.5 |
| battery 41 | | 2.55 | 14.8 | 2.5 | | | 160 | 156 | 97.5 |
| battery 42 | | 2.55 | 7.0 | 2.5 | | | 162 | 159 | 98.1 |

As shown in Table 8, the MnO$_2$ density, the separator air permeability, and the gasket-contact length are appropriately adjusted in combination within the range in which their respective effects are exerted, so that the remaining percentage after storage can be more effectively increased.

The foregoing description is given on the preferred embodiment of this disclosure. However, the description is not intended to limit the present invention and, of course, various modifications can be made. For example, an AA alkaline battery is used as an example in the embodiment described above. However, the same advantages can be obtained for alkaline batteries in the other sizes. The present invention is not limited to cylindrical alkaline batteries but is applicable to rectangular alkaline batteries.

The invention claimed is:

1. An alkaline battery in which a positive electrode and a negative electrode are housed in a battery case with a separator interposed therebetween, wherein the battery case has an opening portion sealed with a sealing plate using a gasket, the positive electrode contains electrolytic manganese dioxide at a potential in the range from 275 mV to 320 mV with respect to a reference electrode of mercurous oxide (Hg/HgO), the negative electrode contains zinc, a closed space is formed between the gasket and the positive and negative electrodes in the battery case and has a volume in the range from 2.0% to 6.0% of a volume inside the battery formed by the battery case and the sealing plate, and a ratio of a height of the negative electrode to a height of the positive electrode is in the range from 1.00 to 1.08.

2. The alkaline battery of claim 1, wherein the ratio of the height of the negative electrode to the height of the positive electrode is 1.04 to 1.08.

3. The alkaline battery of claim 1, wherein manganese dioxide in the positive electrode has a density in the range from 2.55 g/cm$^3$ to 2.70 g/cm$^3$ with respect to a volume of the positive electrode.

4. The alkaline battery of claim 1, wherein the separator has an air permeability in the range from 4.0 cc/cm$^2$/sec to 10.0 cc/cm$^2$/sec.

5. The alkaline battery of claim 1, wherein a protective film is formed on a surface of the positive electrode facing the gasket.

6. The alkaline battery of claim 1, wherein an end portion of the separator in contact with the gasket has a length in the range from 1.0 mm to 2.5 mm.

* * * * *